(12) United States Patent
Miyamaru et al.

(10) Patent No.: US 6,898,335 B2
(45) Date of Patent: May 24, 2005

(54) OPTICAL MODULATOR, EXPOSURE HEAD AND IMAGE RECORDING APPARATUS

(75) Inventors: Fumiaki Miyamaru, Osaka (JP); Mitsuru Sawano, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/987,650

(22) Filed: Nov. 15, 2001

(65) Prior Publication Data

US 2002/0090159 A1 Jul. 11, 2002

(30) Foreign Application Priority Data

Nov. 15, 2000 (JP) .......................................... 2000-347922
Dec. 12, 2000 (JP) .......................................... 2000-376855

(51) Int. Cl.$^7$ .......................... G02B 6/26; G02B 26/08; B41J 2/47
(52) U.S. Cl. ................. 385/1; 385/25; 385/31; 385/130; 359/197; 359/201; 347/239; 347/255
(58) Field of Search .................. 359/198, 199, 359/201, 204, 222; 385/1, 25, 31, 40, 130, 6, 17; 347/238, 239, 241, 255, 256

(56) References Cited

U.S. PATENT DOCUMENTS

| 4,714,326 | A | * | 12/1987 | Usui et al. ................... 359/222 |
| 5,367,584 | A | * | 11/1994 | Ghezzo et al. ................ 385/17 |
| 5,771,321 | A | * | 6/1998 | Stern ............................ 385/31 |
| 5,953,469 | A | * | 9/1999 | Zhou ............................ 385/22 |
| 6,573,924 | B2 | * | 6/2003 | Miyagawa et al. .......... 347/239 |

* cited by examiner

Primary Examiner—Akm Enayet Ullah
Assistant Examiner—Omar Rojas
(74) Attorney, Agent, or Firm—Sughrue Mion, PLLC

(57) ABSTRACT

The optical modulator includes an optical waveguide for receiving light entered from a first end surface thereof and for emitting the light from a second end surface opposing to the first end surface, a flexible light transmitting member disposed so as to face with a boundary surface of the optical waveguide and has a gap between the flexible light transmitting member and the boundary surface of the optical waveguide and a modulation device for bringing the flexible light transmitting member into contact with the boundary surface of the optical waveguide. The image recording apparatus includes the above exposure head and a scanning device for relatively moving a photosensitive material and the exposure head.

14 Claims, 8 Drawing Sheets

OPTICAL MODULATOR, EXPOSURE HEAD AND IMAGE RECORDING APPARATUS

BACKGROUND OF THE INVENTION

1. Field of the Invention

The present invention relates to a technical field of recording an image made by a scanning exposure, and more specifically to an optical modulator, an exposure head and an image recording apparatus capable of realizing a multi-channel image exposure at a low cost.

2. Description of the Related Art

Exposure apparatuses are employed in various kinds of printers and copying equipment, in which a scanning exposure is performed to a silver photography photosensitive material or a photosensitive material such as an electrophotography photosensitive member using a recording light modulated in accordance with an image to be recorded.

At the present time, of such exposure apparatuses, an exposure apparatus employing a so-called laser beam scanning exposure is a mainstream, in which a laser beam modulated in accordance with the image to be recorded is deflected in a main scanning direction and the photosensitive material and the laser beam are relatively moved in a sub-scanning direction as well, which is orthogonal to the main scanning direction, so that the photosensitive material is two-dimensionally scanned by the laser beam and the image is recorded.

As the recent technology advances, this laser beam scanning exposure makes it possible to record an image of high image quality at high speed. However, in the image exposure performed by the laser beam scanning, there is a limitation to increase the speed and improve the resolution. Specially, in a large-format image having a number of applications in a printing field and the like, it is considered that it is difficult to record the image at the higher speed and with a higher image quality in the image exposure performed by the laser beam scanning.

As a method of solving this problem and enabling recording of the image at high speed and with a high image quality, an image exposure using multi-beams is known, in which a plurality of laser beams simultaneously expose the photosensitive material to light.

As a method of realizing the image exposure using multi-beams, as schematically shown in FIG. 12, the following method is generally employed, which uses a multi-channel exposure head 206, in which a fiber couple LD combining a laser diode (LD) 200 and an optical fiber 202 is adopted, and emission openings of the laser beams of the fiber couple LD are aligned in one direction with employing a mount 204 etc.

In this method of exposing multi-beams, each of laser beams requires a fiber couple LD. That is, the fiber couple LDs are required in accordance with the number corresponding to the number of the target laser beams (number of channels).

However, the fiber couple LD is expensive, so the cost of the multi-channel exposure head 206 becomes considerably expensive, thereby having a problem in that it is difficult to increase the number of the channels.

SUMMARY OF THE INVENTION

The present invention has been made to solve the above-mentioned problems inherent in the conventional technology, and therefore has an object to provide an optical modulator capable of increasing the number of channel thereof at a low cost and without causing a cost increase.

In order to attain the object described above, the first aspect of the present invention provides an optical modulator, comprising: an optical waveguide for receiving light entered from a first end surface thereof and for emitting the light from a second end surface opposing to the first end surface; a flexible light transmitting member, disposed so as to face with a boundary surface of the optical waveguide and has a gap between the flexible light transmitting member and the boundary surface of the optical waveguide; and a modulation device for bringing the flexible light transmitting member into contact with the boundary surface of the optical waveguide.

In the above optical modulator according to the first aspect of the present invention, it is preferable that the flexible light transmitting member is formed of a transparent material having electrical conductivity, and the modulation device brings the light transmitting member into contact with the boundary surface of the optical waveguide by using static electricity.

It is also preferable that a plurality of light transmitting members which are the flexible light transmitting member are arranged in a direction orthogonal to a traveling direction of the light in the optical waveguide, and the modulation device is set in correspondence with each of the plurality of light transmitting members.

In order to attain the object described above, the first aspect of the present invention provides an exposure head, comprising: the above optical modulator according to the first aspect of the present invention; and a light source allowing the light to enter into the first end surface on a light incidence side of the optical waveguide.

In the above exposure head according to the first aspect of the present invention, it is preferable that the light source emits the light diffusing in an arrangement direction of the plurality of flexible light transmitting members, and each of the plurality of flexible light transmitting members is disposed so as to have a predetermined distance from the first end surface of the light incidence side of the optical waveguide with respect to the traveling direction of the light.

It is also preferable that the light emitted from the light source is directly entered to the first end surface on the light incidence side of the optical waveguide.

It is further preferable that the exposure head further comprises a lens disposed between a light emission portion of the light source and the first end surface on the light incidence side of the optical waveguide.

It is another preferable that the exposure head further comprises an imaging optical system focusing the light emitted from the optical waveguide at a predetermined position.

In order to attain the object described above, the first aspect of the present invention provides an image recording apparatus, comprising: the above exposure head according to the first aspect of the present invention; and a scanning device for relatively moving a photosensitive material and the exposure head.

In order to attain the object described above, the second aspect of the present invention provides an optical modulator, comprising: an optical waveguide for receiving light entered from a first end surface thereof and for emitting the light from a second end surface opposing to the first end surface; a modulation member having a light interference film, disposed such that a surface of the light interference film faces the first end surface on a light emission side of the optical waveguide; and a driving device for changing an angle of the modulation member with respect to the light emitted from the optical waveguide.

In the above optical modulator according to the second aspect of the present invention, it is preferable that the driving device changes the angle of the modulation member by using static electricity.

It is also preferable that a plurality of modulation members which are the modulation member are arranged in a direction orthogonal to a traveling direction of the light in the optical waveguide, and the driving device is set in correspondence with each of the plurality of modulation members.

In order to attain the object described above, the second aspect of the present invention provides an exposure head, comprising: the above optical modulator according to the second aspect of the present invention; and a light source allowing the light to enter into the first end surface on a light incidence side of the optical waveguide.

In the above exposure head according to the second aspect of the present invention, it is preferable that the light source emits the light diffusing in an arrangement direction of the plurality of modulation members, and the optical waveguide has a length in a direction of light transmission so that an amount of the light entered to each of the plurality of modulation members becomes uniform in correspondence with the light diffusion.

It is also preferable that the light emitted from the light source is directly made incident upon the first end surface on the light incidence side of the optical waveguide.

It is another preferable that the exposure head further comprises a lens disposed between a light emission portion of the light source and the first end surface on the light incidence side of the optical waveguide.

It is further preferable that the exposure head further comprises an imaging optical system for focusing the light emitted from the optical waveguide at a predetermined position.

In order to attain the object described above, the second aspect of the present invention provides an image recording apparatus comprising: the above exposure head according to the second aspect of the present invention; and a scanning device for making a photosensitive material and the exposure head move relatively.

DETAILED DESCRIPTION OF THE PREFERRED EMBODIMENTS

An optical modulator, an exposure head, and an image recording apparatus of the present invention will be described below in detail with reference to preferred embodiments shown in the attached drawings.

First, the optical modulator, the exposure head, and the image recording apparatus of a first aspect of the present invention will be described with reference to FIGS. 1 to 7B.

Figure 1:
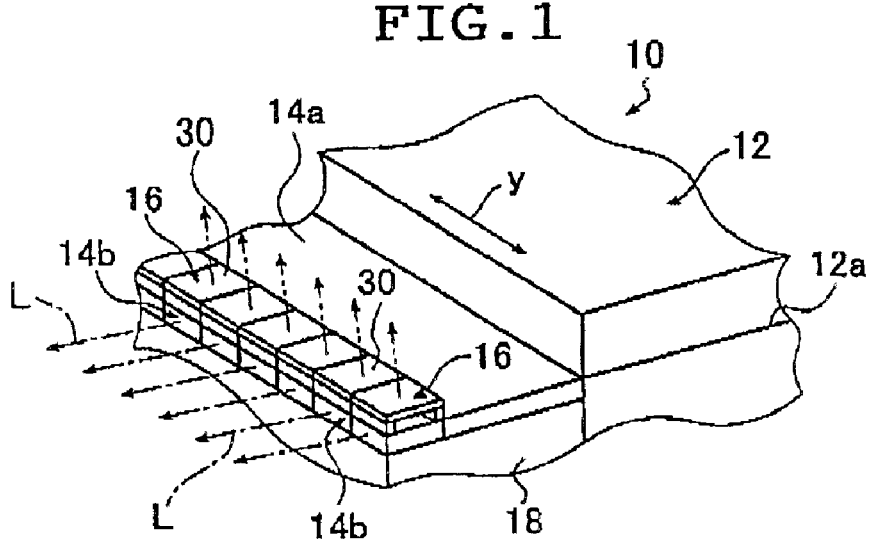
FIG. 1 is a schematic perspective view showing an embodiment of an exposure head of the present invention.
Figure 2:
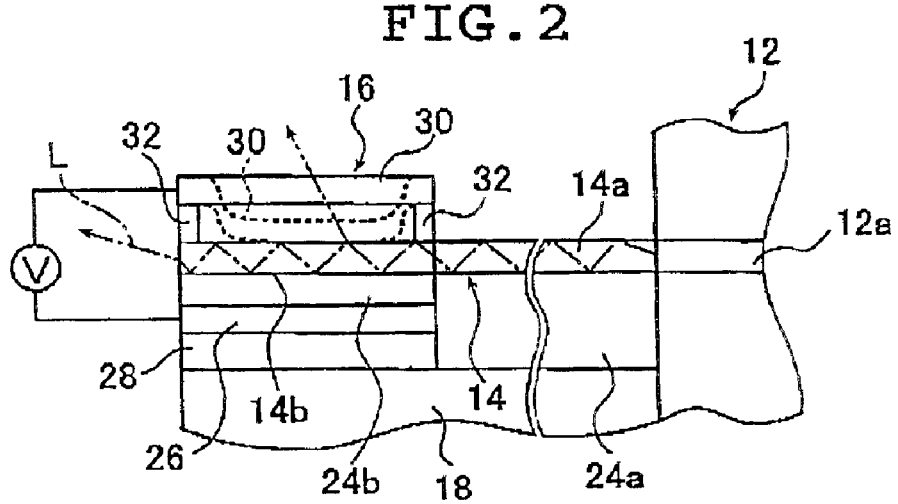
FIG. 2 is a schematic side view of the exposure head shown in FIG. 1.

FIG. 1 illustrates a schematic perspective view showing an embodiment of the exposure head in accordance with a first aspect of the present invention, which adopts the optical modulator of the first aspect of the present invention, and FIG. 2 illustrates a schematic side view thereof (drawing viewed from a scanning direction described below).

An exposure head 10 shown in the figure is a so called multi-channel exposure head for emitting a plurality of laser beams, and basically includes a broad area laser diode (LD) 12, an optical waveguide 14 and a plurality of modulators 16 arranged in a direction indicated by an arrow y in the figure (hereinafter, the direction is referred to as scanning direction). In the figure, the optical modulator of the present invention including the optical waveguide 14 and the modulators 16 is formed on a base material 18.

In the exposure head 10, one of the modulators 16 arranged in the scanning direction (direction orthogonal to the paper surface in FIG. 2) corresponds to an emission of a laser beam L, that is, one channel. The respective modulators 16 modulate laser beams and emit a plurality of laser beams L and expose the photosensitive material to light as indicated by a chain line in the figure.

In the exposure head 10 shown in the figure, the broad area LD 12 (hereinafter referred to as BLD) to be a light source is a laser diode (LD) emitting the laser beam diffused in at least a direction and is disposed on the exposure head 10 so as to make the diffusion direction match with the scanning direction. As an example, the BLD 12 having an active layer 12a in which a plurality of emitters radiating laser beams are disposed in a direction is illustrated, and the BLD 12 is arranged on the exposure head 10 so as to make the arrangement direction match with the scanning direction.

Note that, in the exposure head of the first aspect of the present invention, the light source is not limited to the BLD 12 and various kinds of well-known light sources are applicable.

The optical waveguide 14 is a so-called thin-film optical waveguide. The laser beams emitted from the BLD 12 and diffused in the scanning direction is made incident from one of the end surfaces (incidence end surface) upon the optical waveguide 14, and the laser beams are reflected by a boundary surface and is basically transmitted to a direction substantially orthogonal to the scanning direction (hereinafter, the transmission direction of the laser beams is referred to as traveling direction.)

In the exposure head 10 (modulator) of this aspect, when exposing the photosensitive material to light, the laser beams L are emitted from the other end surface (emission end surface) of the optical waveguide 14 as indicated by the chain line in the figure. On the other hand, when not exposing the photosensitive material to light, the laser beams L are emitted from the boundary surface of the optical waveguide 14 as indicated by a two-dot chain line. This point will be described below in detail.

Here, in the figure, as the preferred aspect, the modulator 16 is disposed at a distance from the incidence end surface of the optical waveguide 14 with respect to the traveling direction of the laser beams in the optical waveguide 14. Note that the modulator 16 in the present invention is not limited to the above-arrangement and may be disposed near the incidence end surface.

In the present invention realizing the multi-channel exposure by employing such a structure in which the modulator 16 arranged in the scanning direction modulates the laser beams transmitted with diffusing in the scanning direction, it is required to obtain the image of the high quality in which the amount of light of the laser beams in accordance with all of the modulators 16 is spatially uniform.

In the figure, the modulator 16 is disposed at a distance toward the traveling direction with respect to the incidence end surface of the optical waveguide 14. That is, some distance is provided between the incidence end surface and the modulating portion of the laser beams in the optical waveguide 14 transmitting the laser beams emitted from the BLD 12. Thus, the amount of light of the laser beams in accordance with all of the modulators 16 is spatially uniform in the scanning direction.

Note that the distance from the incidence end surface to the modulator 16 (the length of the traveling direction of a common waveguide 14a described below in the figure) is not particularly limited, and the length may be appropriately determined in accordance with the state diffusing to the scanning direction of the laser emitted from the BLD 12 (light source) and the number of the modulators 16 (number of channels) so that the amount of light of the laser beams reached to the modulators 16 becomes uniform in the scanning direction.

In the embodiment shown in FIGS. 1 and 2 (similarly in FIG. 3 described below), when responding to this point, the optical waveguide 14 is divided into the common waveguide 14a on the BLD 12 side and an individual waveguide 14b on the emission end side with respect to the traveling direction.

Also, the common waveguide 14a is common to all of the modulators 16 (all of the channels). On the other hand, the individual waveguide 14b is partitioned in the scanning direction in accordance with each of the modulators 16 (each of the channels) as shown in FIG. 1.

The optical waveguide 14 can use various kinds of materials capable of transmitting lights, as long as the materials have a sufficient transmission rate in accordance with the wavelength of the laser beam, and the like. For example, various silicon nitride or the like may be exemplified.

In addition, there is not a limitation on the thickness of the optical waveguide 14, which is a thin-film optical waveguide, and the width of the individual waveguide 14b in the scanning direction. Thus, the thickness and the width may appropriately be determined in accordance with the target resolving power of the exposure head 10, the number of the channels, or the like.

Note that, in FIG. 1 and FIG. 2, a light emission portion of the BLD 12 connects directly with the incidence end surface of the optical waveguide 14. However, the exposure head of the present invention is not limited to this arrangement.

Figure 3:
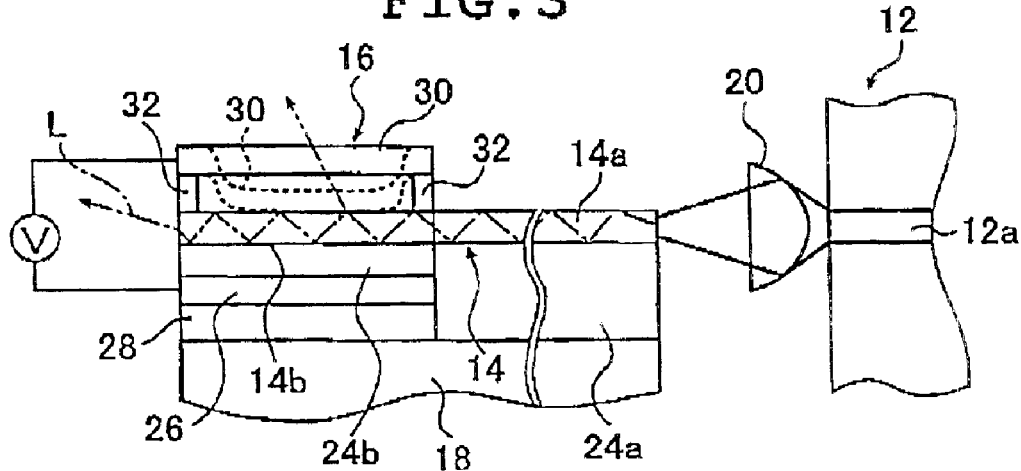
FIG. 3 is a schematic side view showing another embodiment of the exposure head of the present invention.

For example, when the utility efficiency of the light emitted from the BLD 12 is low in this construction, a lens 20 condensing light may be disposed between the BLD 12 and the optical modulator (incidence end surface of the optical waveguide 14) as shown in FIG. 3.

Figure 4A:
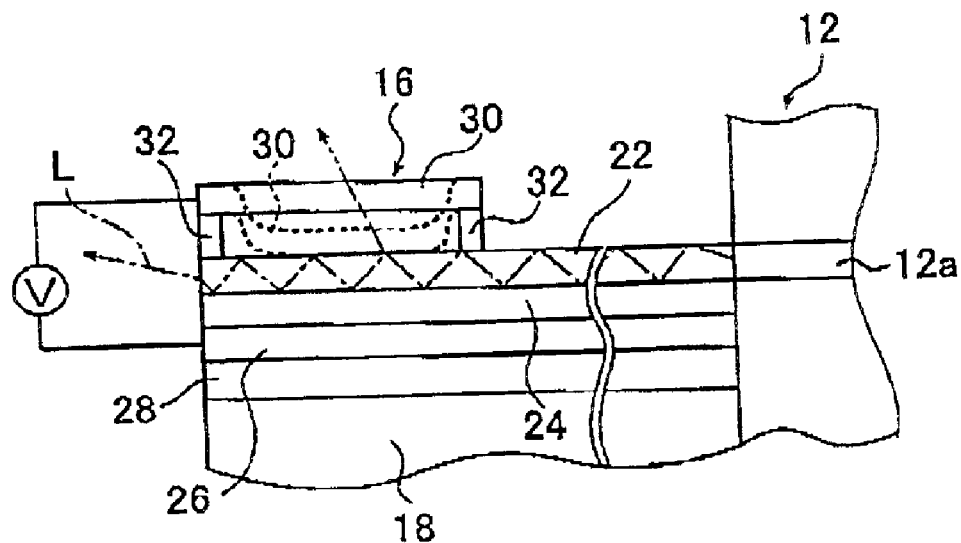
FIG. 4A is a schematic side view showing another embodiment of the exposure head of the present invention.
Figure 4B:
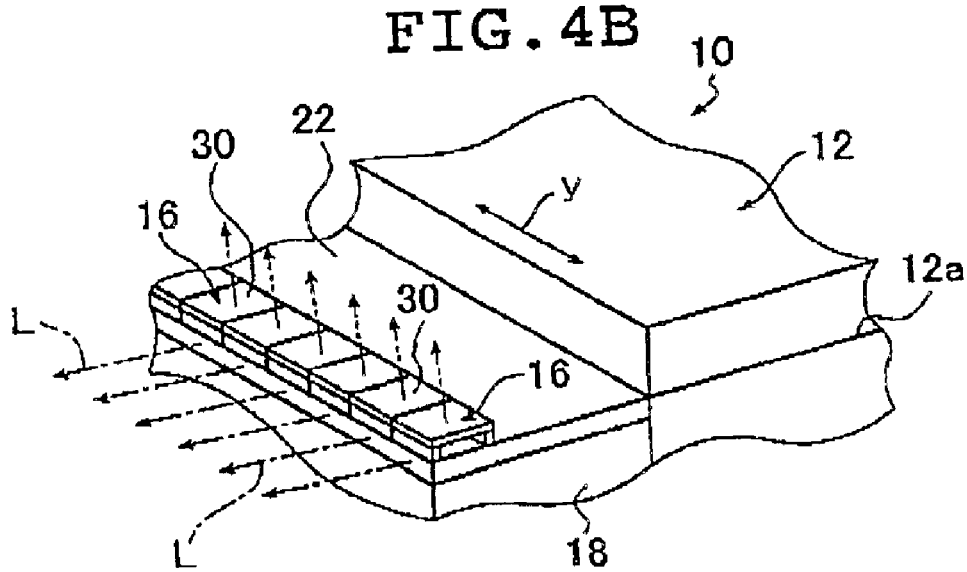
FIG. 4B is a schematic perspective view thereof.

In addition, without dividing the optical waveguide 14 into the common waveguide 14a and the individual waveguide 14b, an optical waveguide 22 integrating both of the optical waveguides may be disposed as shown in FIGS. 4A and 4B. Note that, in this construction, the optical waveguide 22 may be integrated as shown in FIG. 4B or may be partitioned in the scanning direction in correspondence with each of the modulators 16. Also, the optical waveguide in the modulator 16 may be integrated in the scanning direction in the aspect shown in FIGS. 1 and 2.

When selecting either the construction shown in FIG. 1 or the construction shown in FIGS. 4A and 4B, one having more advantage may be selected in accordance with, for example, a manufacturing method.

In the figure, the optical waveguide 14 (optical waveguide 22) is formed on a reflective layer 24 (24a and 24b). Note that, in FIG. 2 (and FIG. 3), the reflective layer 24 is divided into the reflective layer 24a and the reflective layer 24b. However, both of the reflective layers may integrally be formed.

There is not a particular limitation on the material for the formation of the reflective layer 24 (the layer on the side opposing to the modulator 16 with respect to the optical waveguide 14), and various materials having a lower refractive index than that of the optical waveguide 14 are applicable. For example, when the optical waveguide 14 is made of silicon nitride, silicon oxide ($SiO_2$) and the like are exemplified.

An electrode layer 26 is formed below the reflective layer 24. Note that the electrode layer 26 is formed on a base portion 28 on the base material 18, but the base material 18 may be integrated with the base portion 28 or arranged so as to be separated from the base portion 28. Also, the electrode layer 26 may be partitioned in the scanning direction in accordance with each of the modulators 16 (transparent electrodes 30) or common to all of the modulators 16.

The modulator 16 is formed such that the individual waveguide 14b are sandwiched by the electrode layer 26 and the modulator 16. The modulator 16 includes the plate-shaped transparent electrode 30 and a spacer 32. The transparent electrode 30 is disposed so as to face the boundary surface of the individual waveguide 14b at a predetermined gap via the spacer 32.

In addition, the transparent electrode 30 and the electrode layer 26 are connected with a driving power source for driving each of the modulators 16. A micro electronic mechanical system (MEMS) is composed of the electrode layer 26, the modulator 16, and the driving power source.

As shown in FIG. 2, in the state that the driving voltage is not applied between the transparent electrode 30 and the electrode layer 26, the transparent electrode 22 is not deformed, and the transparent electrode 30 and the individual waveguide 14b are arranged at a distance.

In this state, the laser beams emitted from the BLD 12 is made incident from the incidence end surface upon the common waveguide 14a, it is repeated to reflect the laser beams by the boundary surface of the common waveguide 14a as illustrated by the chain line, and the laser beams are transmitted. Next, the laser beams are similarly transmitted to the individual waveguide 14b and are emitted as the laser beam L exposing the photosensitive material to light from the emission end surface of the individual waveguide 14b.

Contrary to this, when the voltage is applied between the transparent electrode 30 and the electrode layer 26, the transparent electrode 22 is deformed (curved) by a static electricity generated between the transparent electrode 30 and the electrode layer 26 as illustrated by a dotted line, and the transparent electrode 30 contacts with the boundary surface of the individual waveguide 14b.

Similarly to the above-description, the laser beams are made incident from the incidence end surface upon the common waveguide 14a, are reflected by the boundary surface and transmitted, and are made incident upon the individual waveguide 14b. Here, if the transparent electrode 30 contacts with the boundary surface of the individual waveguide 14b, a critical angle is changed, so the laser beams are not reflected by the boundary surface. Therefore, the laser beams entered into the individual waveguide 14b are penetrated through the boundary surface of the individual waveguide 14b as indicated by the chain double-dashed line in the figure, and are made incident upon and pass through the transparent electrode 30 to be emitted upwardly. The laser beams are not emitted as the laser beam L exposing the photosensitive material to light.

That is, the transparent electrode 30 is in contact with the individual waveguide 14b or disposed at a distance from the individual waveguide 14b by executing the ON/OFF of the driving voltage, so the ON/OFF for emitting the laser beam L from the emission end surface of the optical waveguide 14 is performed to enable modulation of the laser beams.

A plurality of modulators 16 are provided so as to be arranged in the scanning direction. Also, the individual waveguide 14b is formed in correspondence with each of the modulators 16 as described above. In addition, the BLD 12 emits the laser beams diffused in the scanning direction. The modulator 16 is disposed at a distance from the incidence end surface of the optical waveguide 14 in the traveling direction. Thus, the laser beams in the modulator include the uniform amount of light in the scanning direction, that is, the amount of light of the laser beam entered to each of the individual waveguide 14b is uniform. Each of the channels is capable of emitting the laser beam L having the uniform amount of light.

Therefore, according to the exposure head 10, the multi-channel exposure is preferably performed by using a plurality of laser beams L each having the uniform amount of light to enable realization of the image recording at a high speed and with a high image quality. Further, the implementation of the multi-channel exposure is realized by combining a micro-machine such as the MEMS, the optical waveguide 14 and the low-cost BLD. Thus, compared with the conventional multi-channel exposure using the expensive fiber couple LD, the present multi-channel exposure is at lower cost and easily enables an increase in the number of the channels.

The transparent electrode 30 does not have a particular limitation on the material, and various kinds of the transparent materials having electrical conductivity are applicable. For example, indium tin oxide (ITO) and the like are enumerated. Also, the thickness of the transparent electrode 30 which makes it possible to contact with the optical waveguide 14 by being deformed by the electrostatic force may be appropriately determined in accordance with the material for formation.

On the other hand, the electrode 26 making a pair with the transparent electrode 30 does not have a particular limitation on the material either, and various kinds of conductive materials are applicable. Also, the electrode 26 can use the same material as that of the transparent electrode 30.

In this aspect, the driving method (modulating method) of the modulator 16 is not limited to the method using the electrostatic force with use of the transparent electrode 30. Various kinds of methods are applicable, in which a member having a light transmission property is deformed to contact with the optical waveguide.

For example, instead of using the transparent electrode 30 in the figure, a plate material having a light transmission property may be disposed, mechanically deformed by a driving means such as a piezo element and made to contact with the optical waveguide 14, so that each of the channels is modulated.

The optical modulator (except for the BLD 12) composing the exposure head 10 of this aspect does not have a particular limitation on the construction method. For example, it may be constructed by using various kinds of deposition technology, photolithography or the like, which is applied to the manufacture of a semiconductor or a micromachine in accordance with the formation materials for the layers, the films and the like.

In the embodiment shown in FIG. 1, the exposure head 10 is constructed of only single line of the optical modulator of the present invention, in which the modulators 16 and the like are arranged in the scanning direction. However, the present invention is not limited to this construction. The improvement of the resolution or the implementation of the multi-channel exposure may be attained by using a plurality of lines of the optical modulator of the present invention.

Figure 5:
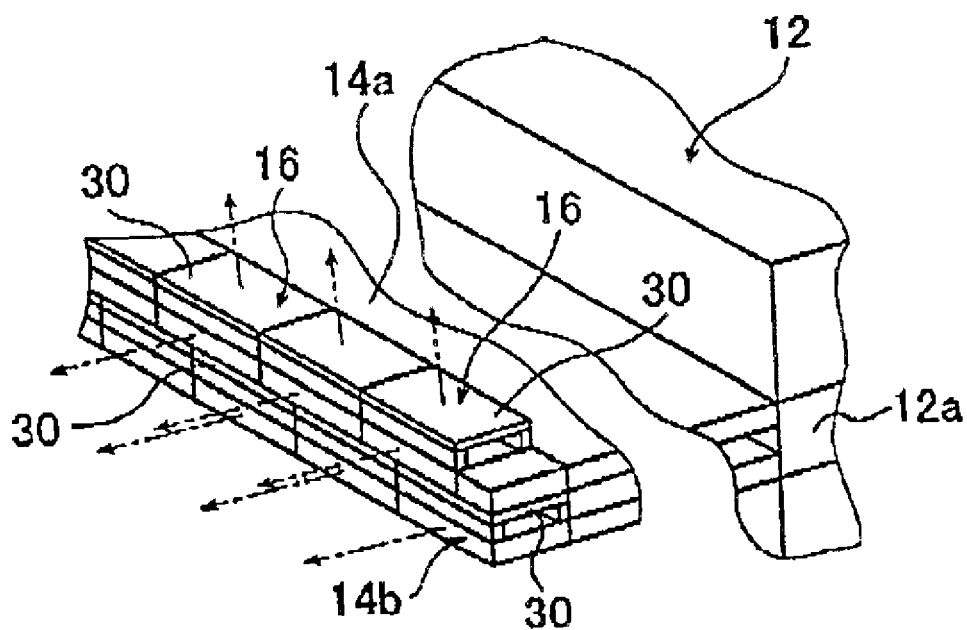
FIG. 5 is a schematic perspective view showing still another embodiment of the exposure head of the present invention.

For example, as shown in FIG. 5, the method for attaining the improvement of the resolution or the implementation of the multi-channel exposure is illustrated in which the optical modulator of the present invention composed of the optical waveguide 14 and the modulators 16 arranged in the scanning direction has a double-layer construction.

Figure 6:
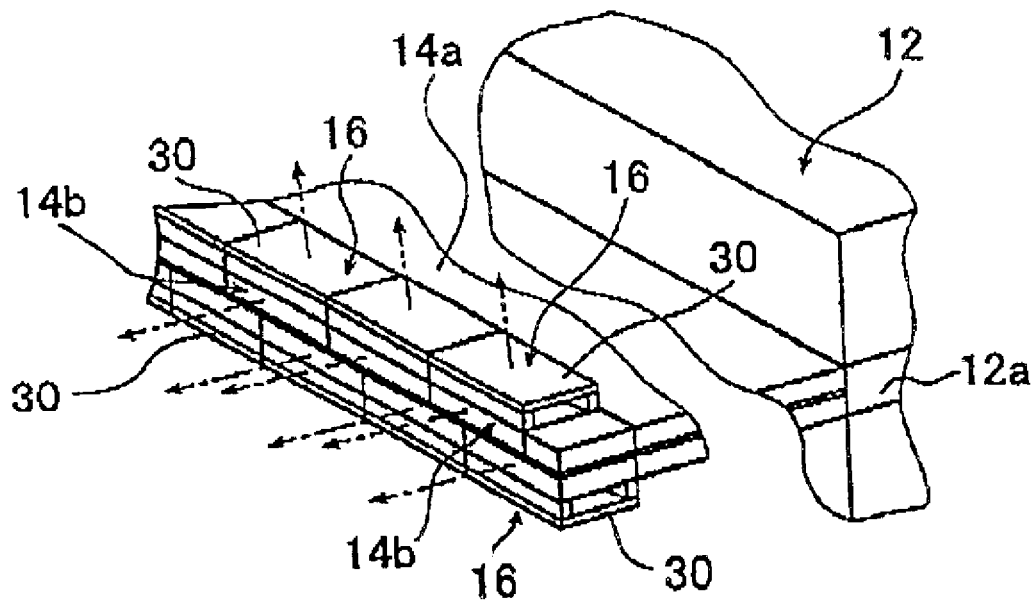
FIG. 6 is a schematic perspective view showing yet another embodiment of the exposure head of the present invention.

In addition, as shown in FIG. 6, the method for attaining the improvement of the resolution or the implementation of the multi-channel exposure is also preferred in which two optical modulators of the present invention each of which is composed of the optical waveguide 14 and the modulators 16 arranged in the scanning direction are stacked directing the modulators 16 outwards so as to make the relationship of the front and back.

Similarly in these aspects, the lens may be disposed between the BLD 12 and the optical modulator (incidence end surface of the optical waveguide 14) as required.

In the present invention described above, the photosensitive material is exposed to light by the laser beam L emitted from the end surface of the optical waveguide 14. However, it is also possible to expose the photosensitive material to light by the laser beams emitted from the transparent electrode 30 (member having a light transmission property) as indicated by the chain double-dashed line in the figure and to record an image. Also, similarly in this case, a plurality of lines of the optical modulator of the present invention can be used. For example, the exposure head or the like may be constructed by arranging two lines of the optical modulator of the present invention in which the modulators 16 and the like are disposed in the scanning direction. However, it is not always that single laser beam is emitted from the transparent electrode 30. Also, there are many cases where the emission direction and the emission position are unstable. Therefore, when recording the image having the high resolving power (high definition) and the high image quality, the construction has a disadvantage compared with the present invention using the laser beam L emitted from the end surface of the optical waveguide 14.

Figure 7A:
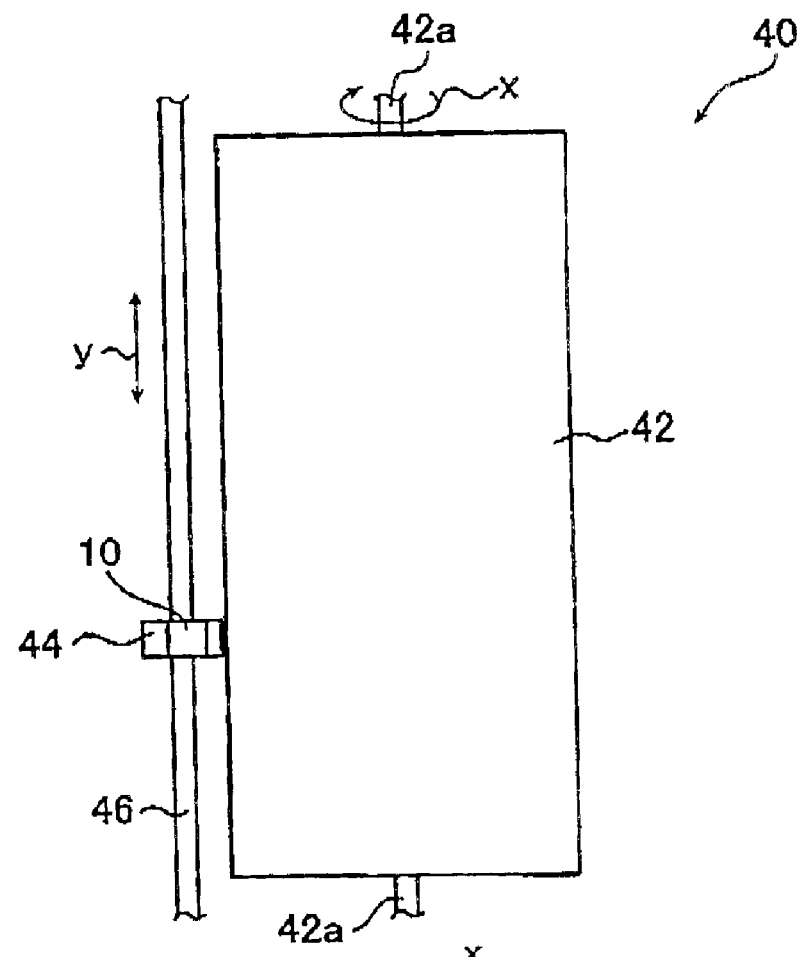
FIG. 7A is a schematic plan view showing an embodiment of an image recording apparatus of the present invention.
Figure 7B:
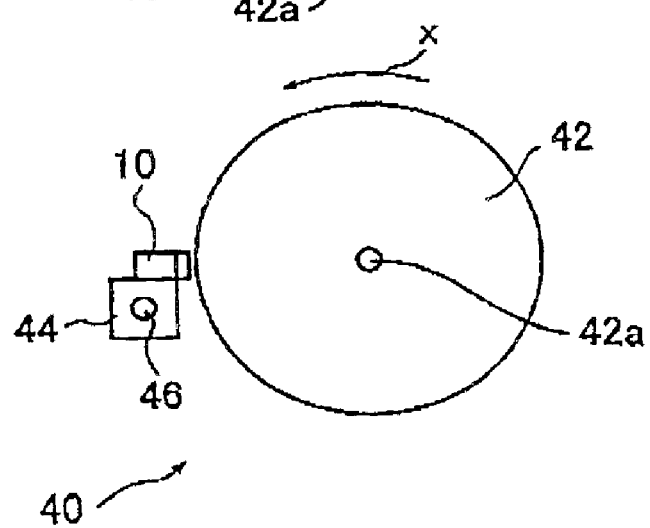
FIG. 7B is a schematic side view thereof.

The exposure head of present invention described above is applicable to various kinds of the image recording apparatus such as a computer to plate (CTP), an image setter, a digital direct color proof (DDCP), a printer and a copying machine. In FIGS. 7A and 7B, an embodiment of the image recording apparatus using the exposure head 10 of the present invention is described. Here, FIG. 7A is a schematic plan view thereof and FIG. 7B is a schematic side view thereof.

The embodiment in FIGS. 7A and 7B shows a so-called drum scanner exposing to light with winding the photosensitive material around a drum 42, which is similar to the normal drum scanner except for using the exposure head 10 of the present invention. Such an image recording apparatus 40 includes the drum 42, a carriage 44 holding the exposure head 10 of the present invention and a guide 46 guiding the carriage 44.

The drum 42 holds the photosensitive material around the side surface and rotates around a rotation shaft 42a, for example, at a predetermined speed in the direction of the arrow x. A well-known means may be adopted as the means for holding the photosensitive material by the drum 42.

The exposure head 10 is held by the carriage 44 so as to make the scanning direction (arrangement direction of the modulator 16, that is, the direction of the arrow y) match with a shaft line of the drum 42. Also, the carriage 44 is held so as to be freely movable on the guide 46 extending in the scanning direction and moves in the scanning direction by a well-known means.

In the image recording apparatus 40 of this type, the drum 42 is rotated (main scanning) at the predetermined speed in the direction of an arrow X and the exposure head 10 is moved (sub-scanning) by the carriage 44 in the scanning direction, so that the photosensitive material held by the drum 42 is two-dimensionally scanned by the exposure head 10 having the multi-channels.

At this time, as described above, the transparent electrode 30 of the modulator 16 is brought into contact with the boundary surface of the individual waveguide 14b or disposed at a distance from the boundary surface of the individual waveguide 14b, with the result that the laser beam L emitted from each of the channels (emission end surface of the individual waveguide 14b) is modulated in accordance with the recording image, and the image-like exposure to the photosensitive material is performed by the laser beams L, and the image is recorded. Note that the image recording may be performed by the well-known method in the image recording in which the modulation of the laser beam L such as the modulation of the pulse-width is executed and the photosensitive material is exposed to light.

In the image recording apparatus of the first aspect of the present invention, the exposure, as in a so-called contact exposure, may be performed so as to make the laser beams L emitted from the exposure head 10 enter directly into the photosensitive material. Alternatively, the exposure may be performed by disposing an imaging optical system between the exposure head 10 and the photosensitive material to expose the photosensitive material to light by the laser beams L.

When selecting the exposure method, one having more advantage may be selected in accordance with various factors such as the cost, the target resolution, the number of the channels and the target image recording time.

Next, an optical modulator, an exposure head and an image recording apparatus according to a second aspect of the present invention will be described with reference to FIGS. 8A to 11B.

Figure 8A:
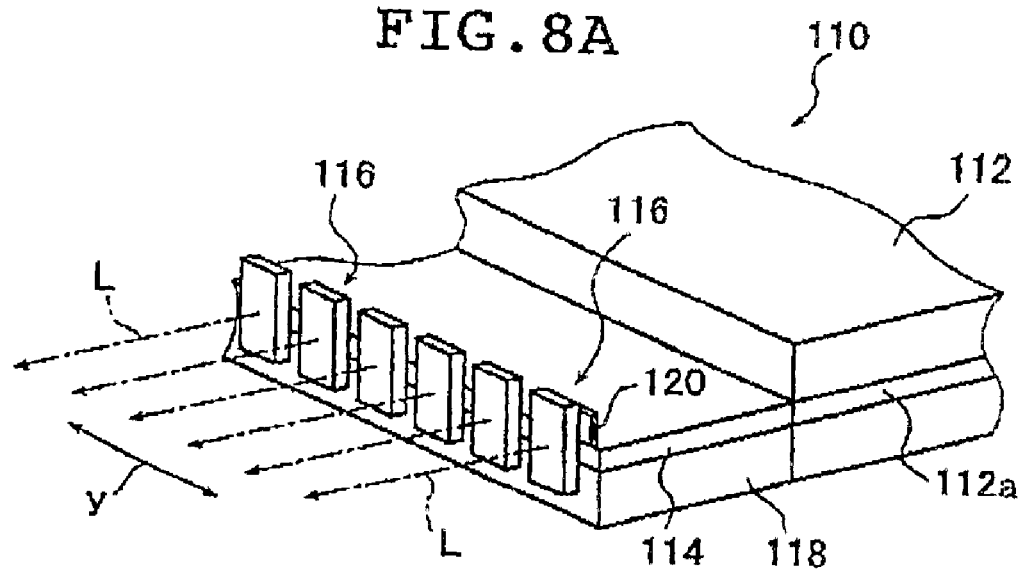
FIG. 8A is a schematic perspective view showing yet another embodiment of the exposure head of the present invention and FIG. 8B is a schematic side view thereof.
Figure 8B:
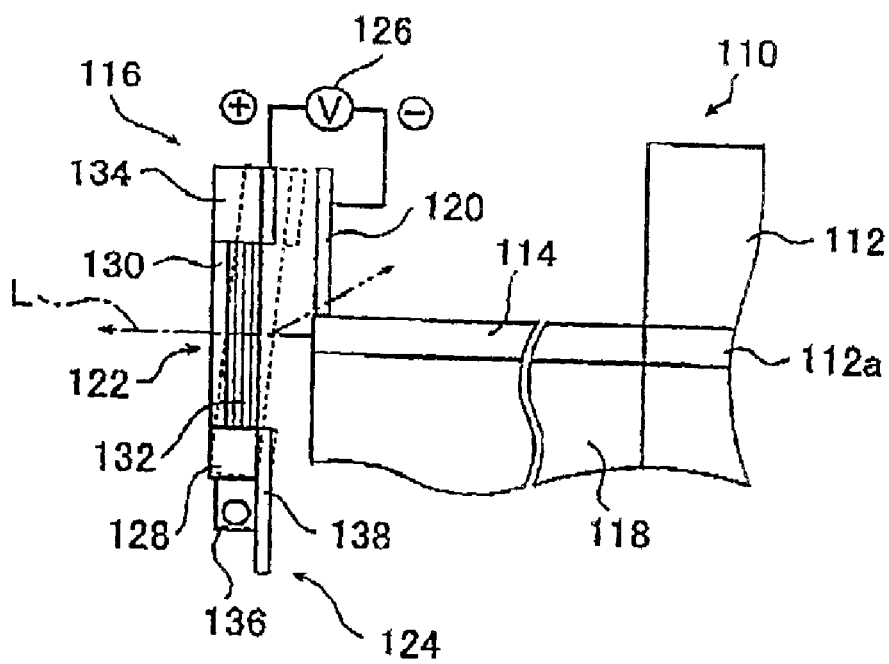

FIG. 8A is a schematic perspective view showing an example of the exposure head of the present invention which uses the optical modulator of the present invention, and FIG. 8B is a schematic side view thereof (the view looked from a scanning direction described below, that is, the direction of the broad area).

An exposure head 110 shown in FIGS. 8A and 8B is a so-called multi-channel exposure head emitting a plurality of laser beams. The exposure head 110 basically includes a BLD 112, an optical waveguide 114 and a plurality of modulators 116 disposed in a direction (hereinafter, referred to as scanning direction) indicated by the arrow y (direction orthogonal to the paper surface in FIG. 8B) in the figure.

In the exposure head 110, one of the modulators 116 disposed in the scanning direction corresponds to the emission of one of laser beams L, that is, one of channels. Each of the modulators 116 modulates the laser beam. The exposure head 110 emits a plurality of laser beams L as indicated by the chain line in the figure and exposes the photosensitive material to light.

In the exposure head 110 shown in the figure as an example, the BLD 112 to be a light source is an LD emitting the laser beam diffused in at least a direction similarly to the BLD 12 shown in FIG. 1 and is disposed on the exposure head 110 so as to make the diffusion direction (broad area direction) match with the scanning direction. As an example, the BLD 112 having an active layer 112a in which a plurality of emitters emitting the laser beams are arranged in a direction is illustrated. In the BLD 112, the arrangement direction of the emitters becomes the diffusion direction. Thus, the BLD 112 is disposed on the exposure head 110 so as to make this direction match with the scanning direction.

Note that, in the exposure head of this aspect, the light source is not limited to the BLD 112 and various kinds of the well-known light sources employed for the exposure head with use of the laser beams are applicable.

For example, the optical waveguide 114 is formed of a so-called thin-film optical waveguide. The laser beams diffused in the scanning direction emitted from the BLD 112 are made incident from one of the end surfaces (incidence end surface) upon the optical waveguide 114, and the laser beams are reflected by the boundary surface and basically transmitted to the direction orthogonal to the scanning direction.

In the exposure head 110 (modulator) of the present invention, the laser beams L emitted from the optical waveguide 114 are penetrated through the modulator 116 as indicated by the two-dot chain line in the figure at the time of emission (time of exposing the photosensitive material to light). On the other hand, at the time of non-emission (time of non-exposing the photosensitive material to light), the laser beams L are reflected by the modulator 116 as indicated by the chain double-dashed line (See FIG. 8B). This point will be described below in detail.

The optical waveguide 114 can use various kinds of materials capable of transmitting lights as long as the materials have a sufficient transmissivity in accordance with the wavelength of the laser beam and the like. For example, various kinds of silicon nitride and the like are exemplified.

In addition, there is no limitation on the thickness of the optical waveguide 114, the length of the traveling direction, and the like. Thus, the thickness and the length may be appropriately determined in accordance with the target resolving power of the exposure head 110, the number of the channels, or the like.

Here, in the present invention realizing the multi-channel exposure by modulating the laser beams transmitted with diffusion in the scanning direction by the modulators 116 arranged in the scanning direction, it is preferred for obtaining the image of the high image quality in which the amount of light of the laser beam emitted from all of the modulators 116 is uniform.

Therefore, it is preferred that the optical waveguide 114 has a length (optical path length) to some extent in the transmission direction of the laser beam so as to make the amount of light of the laser beam reached to the modulator 116 by being transmitted through the optical waveguide 114 uniform in the scanning direction, as shown in FIGS. 8A and 8B. Note that this length may appropriately be determined in accordance with the state diffusing to the scanning direction of the laser emitted from the BLD 112 (light source) and the number of the modulators 116 (number of the channels) so that the amount of light of the laser beam reached to the modulator 116 becomes uniform.

In the figure, the optical waveguide 114 is formed on a reflective layer 118. There is not a particular limitation on the material for formation of the reflective layer 118. Various kinds of materials having a lower refractive index than that of the optical waveguide 114 are applicable, and the reflective layer 118 may be formed by the well-known method. For example, when the optical waveguide 114 is made of silicon nitride, silicon oxide ($SiO_2$) or the like is exemplified.

A plurality of modulators 116 are disposed near the (laser beam) emission end surface of the optical waveguide 114.

In the figure, the modulator 116 includes an electrode plate 120, a modulation member 122, a supporting means 124 and a driving power source 126 (omitted in FIG. 8A).

In the figure, the electrode plate 120 is a conductive plate material provided so as to be stood perpendicular to the optical waveguide 114 in the end portion on the emission end surface side.

Note that the electrode plate 120 may be individually provided for each of the modulators 116 (each of the channels) or provided as a plate common to all of the modulators 116. Also, the electrode plate 120 may be fixed directly to the optical waveguide 114, separately include a supporting member or use both the methods.

The modulation member 122 is constituted of a fixing member 128, a supporting plate 130, a dielectric multi-layer film 132 and an electrode 134.

The fixing member 128 is, for example, a member having a rectangular shape and fixed to the supporting means 124 (a plate spring 138 thereof) as described below. The supporting plate 130 is a transparent plate member (capable of transmitting the laser beams) fixed to the fixing member 128 and has rigidity preventing a curve induced by an angle change described below, and also the dielectric multi-layer film 132 is formed on the surface. Note that the fixing member 128 may integrally be constructed with the supporting plate 130. Also, when the dielectric multi-layer film 132 has sufficient rigidity preventing a curve induced by the angle change described below, the supporting plate 130 may not be always provided.

In the figure, the dielectric multi-layer film 132 is formed so as to transmit the laser beams entered at right angles to the film surface and reflect others except the laser beams. Note that the material for the formation of the dielectric multi-layer film 132 may appropriately be determined in accordance with the wavelength of the used laser beam.

The electrode 134 constitutes a pair of the electrodes with the above-described electrode plate 120, and is fixed on the end surface of the supporting plate 130 which is on the opposite side to the fixing member 128. Both of the electrodes are connected with the driving power source 126. In the figure, the electrode plate 120 is connected with a negative pole and the electrode 134 of the modulation member 122 is connected with a positive pole.

The supporting means 124 includes a base material 136 fixed onto the predetermined position of the exposure head 110 such as a flame (not shown) and a plate spring 138 held by this base material 136.

The fixing member 128 of the modulation member 122 is fixed onto the plate spring 138 so as to make the surface of the supporting plate 130 (that is, the dielectric multi-layer film 132) face the emission end surface of the optical waveguide 114 and also make this surface orthogonal to an optical axis (hereinafter, referred to simply as the optical axis) of the laser beams (chain line in the figure) emitted from the exposure head 110 of the present invention.

Also, the base material 136 is fixed at the predetermined position of the exposure head 110 so as to make the electrode 134 of the modulation member 122 fixed to the plate spring 138 face the electrode plate 120 with a predetermined gap. Note that the base material 136 may be provided for each of the modulators 116 or common to all of the modulators 116.

In the figure, the modulator 116 constitutes the micro electronic mechanical system (MEMS) using static electricity as the driving force, which is composed of the electrode plate 120, the plate spring 138 of the supporting means 124, the modulation member 122 in which one of the ends thereof is fixed to the plate spring 138 and the driving power source 126.

Note that the modulator 116 may be constructed by using the technology for manufacturing a semiconductor apparatus or a micro-machine.

In the exposure head 110 shown in the figure, in the state that the driving power source 126 does not apply a voltage to the electrode plate 120 and the electrode 134 (the driving power source 126 is OFF), the modulation member 122 is in the state indicated by a solid line of FIG. 8B, that is, the surface of the dielectric multi-layer film 132 is orthogonal to the optical axis (of the laser beams L emitted from the exposure head).

As described above, the dielectric multi-layer film 132 transmits the laser beams entered at right angles thereto and reflects others except the laser beams. Therefore, in this state, the laser beams are emitted from the optical waveguide 114 entered to the dielectric multi-layer film 132 in the direction of the optical axis. The incident laser beams are penetrated through the dielectric multi-layer film 132 and the supporting plate 130 as they are and travel in the direction of the optical axis as shown by the chain line in FIG. 8A. That is, in this state, this modulator 116 emits the laser beams L for exposing the photosensitive material to light.

Contrary to this, when the driving power source 126 is driven to apply a voltage to the electrode plate 120 and the electrode 134, static electricity is generated between both of the electrodes disposed at a distance and both of the electrodes are pulled each other, with the result that the plate spring 138 supporting one end of the modulation member 122 is curved by this force as shown by the dotted-line in FIG. 8B; the modulation member 122 is inclined; and the surface of the dielectric multi-layer film 132 is inclined with respect to the optical axis.

Therefore, in this state, as indicated by the chain-doubled line in FIG. 8B, the laser beams are emitted from the optical waveguide 114 and entered to the dielectric multi-layer film 132 in the direction of the optical axis, and the incident laser beams are reflected by the dielectric multi-layer film 132. That is, in this state, this modulator 116 does not emit the laser beams L.

That is, the angle of the supporting plate 130, that is, the dielectric multi-layer film 132, is changed by executing ON/OFF of the driving power source 126 and the laser beams entered to the dielectric multi-layer film 132 in the direction of the optical axis are penetrated or reflected, so the laser beams L can be modulated for each of the modulators 116.

As described above, a plurality of modulators 116 are arranged in the scanning direction. In addition, the BLD 112 emits the laser beams diffused in the scanning direction. In the figure, the optical waveguide 114 has a length to some extent in the transmission direction, with the result that the amount of light of the laser beam entered to each of the modulators 116 is uniform and each of the channels is capable of emitting the laser beam L having the uniform amount of light.

Therefore, according to the exposure head 110 of the present aspect, the multi-channel exposure is preferably performed with use of a plurality of laser beams L each having the uniform amount of light the image recording at a high speed and with a high image quality. Further, the implementation of the multi-channel exposure is realized by combining the micro-machine such as the MEMS, the optical waveguide 114 and the low-cost BLD. Thus, the exposure head 110 is low in cost, and easily enables an increase in the number of the channels compared with the conventional multi-channel exposure with use of the expensive fiber couple LD.

In the present invention, the driving method (modulating method) of the modulator 116 is not limited to the method using the electrostatic force such as that shown in the figure, and various kinds of methods are applicable.

For example, it is also possible to adopt a method in which the electrode 134 of the modulation member 122 is formed of nonconductive material and pushed-and-moved by various kinds of electrical strain material or magnetic strain material such as a piezo element, so the angle of the modulation member 122 is changed.

Figure 9:
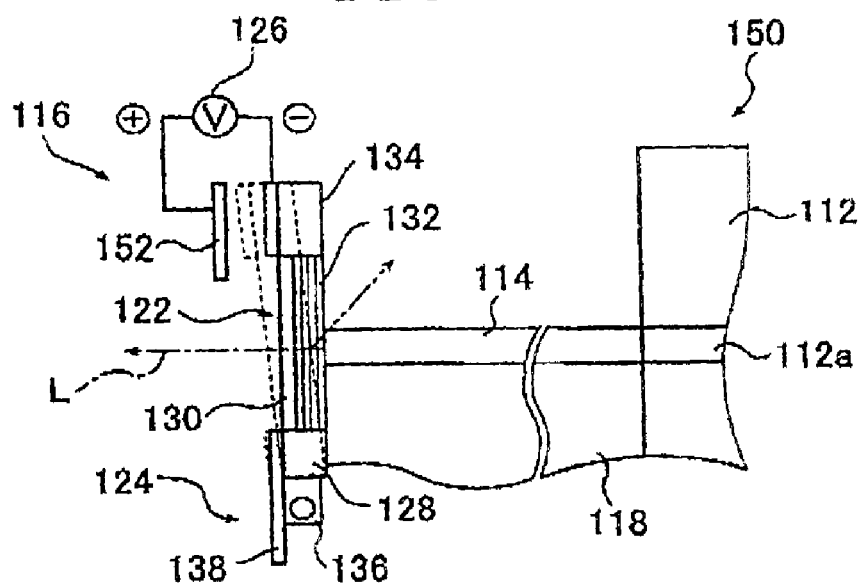
FIG. 9 is a schematic side view showing yet another embodiment of the exposure head of the present invention.

FIG. 9 is a side view showing another embodiment of the exposure head of this aspect.

Note that a number of members of the embodiment shown in FIG. 9 are similar to those of the embodiment shown in FIGS. 8A and 8B, and thus, the same symbols are used to designate the similar members and the different portions will be mainly described below.

In the modulator 116 of the embodiment shown in FIGS. 8A and 8B, the electrode plate 120 is disposed on the optical waveguide 114. However, in an exposure head 150 shown in FIG. 9, an electrode plate 152 constituting the MEMS is disposed at the lower stream side than the emission end surface of the optical waveguide 114, and also the modulation member 122 is arranged between the electrode plate 152 and the optical waveguide 114.

Note that, in the state that the driving power source 126 is not driven, the electrode plate 152 is fixed onto the predetermined position of the exposure head 150 by a well-known method so as to be disposed at a predetermined distance from the electrode 134 of the modulation member 122, though not particularly shown in the figure.

Further, in the modulation member 122 of the embodiment shown in FIG. 9, in the state that the driving power source 126 is not driven, the dielectric multi-layer film 132 is orthogonal to the optical axis similarly to the previous example and is disposed such that the surface is brought into contact with the emission end surface of the optical waveguide 114. In other words, the base material 136 of the fixing means 124 is disposed at a predetermined position of the exposure head 150 and the plate spring 138 supporting the modulation member 122 is fixed to this base material 136 in order to satisfy the above structure.

Similarly to the previous example, when the driving power source 126 is in the state of OFF, there is not a electrostatic force between the electrode plate 152 and the electrode 134 and the dielectric multi-layer film 132 is orthogonal to the optical axis as indicated by the solid line in FIG. 9.

Therefore, in this state, the laser beams entered to the dielectric multi-layer film 132 in the direction of the optical axis are penetrated through the dielectric multi-layer film 132 and the supporting plate 130 as they are. That is, in this state, this modulator 116 emits the laser beam L exposing the photosensitive material to light as indicated by the chain line in FIG. 9.

Contrary to the above-description, when the driving power source 126 is driven to apply a voltage to the electrode plate 152 and the electrode 134, static electricity is generated between both of the electrodes similarly to the previous example. Thus, the plate spring 138 is curved, the modulation member 122 is inclined, and the surface of the dielectric multi-layer film 132 is inclined with respect to the optical axis as indicated by the dotted-line in FIG. 9.

Therefore, in this state, the laser beam incident to the dielectric multi-layer film 132 in the direction of the optical axis is reflected by the dielectric multi-layer film 132 as indicated by the chain double-dashed line. In this state, this modulator 116 does not emit the laser beam L.

That is, it is possible to modulate the laser beam L for each of the modulators 116 by executing ON/OFF of the driving power source 126.

In the example shown in FIG. 9, when the laser beam L is emitted, the emission end surface of the optical waveguide 114 contacts with the surface of the dielectric multi-layer film 132. Therefore, the example shown in FIG. 9 may be more advantageous than the example shown in FIGS. 8A and 8B in the utility efficiency of the laser beam depending on the construction or the used material.

In the above-described examples shown FIGS. 8A and 8B and FIG. 9, the light emission portion of the BLD 112 connects directly with the incidence end surface of the optical waveguide 114. However, the exposure head of the present invention is not limited to this construction.

Figure 10:
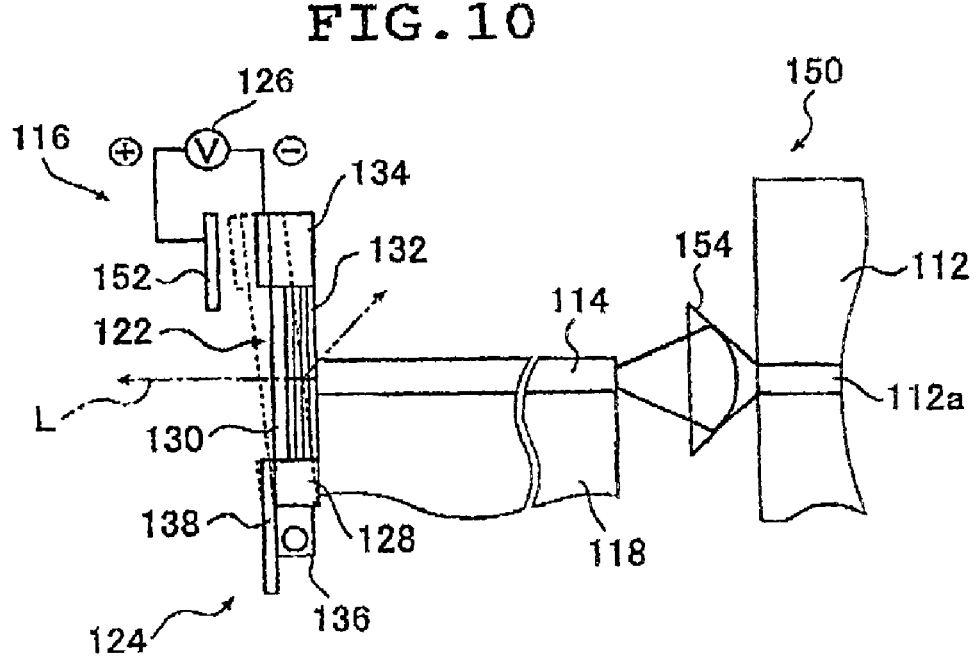
FIG. 10 is a schematic side view showing yet another embodiment of the exposure head of the present invention.

For example, when the utility efficiency of the laser emitted from the BLD 112 is not sufficient in the constructions shown in FIGS. 8A and 8B and FIG. 9, a lens 154 condensing light may be disposed between the BLD 112 and the optical modulator (incidence end surface of the optical waveguide 114) as shown in FIG. 10 using the construction of FIG. 9.

In addition, in the above-described embodiments, the exposure head of the present invention is constructed by using a line of the optical modulator of the present invention in which the modulators 116 and the like are arranged in the scanning direction. However, the present invention is not limited to this construction. For example, the improvement of the resolution or the implementation of the multi-channel exposure may be attained by arranging a plurality of lines of the optical modulator of the present invention so as to construct a lamination layer in the direction orthogonal to the diffusion direction of the laser emitted from the BLD 112.

Figure 11A:
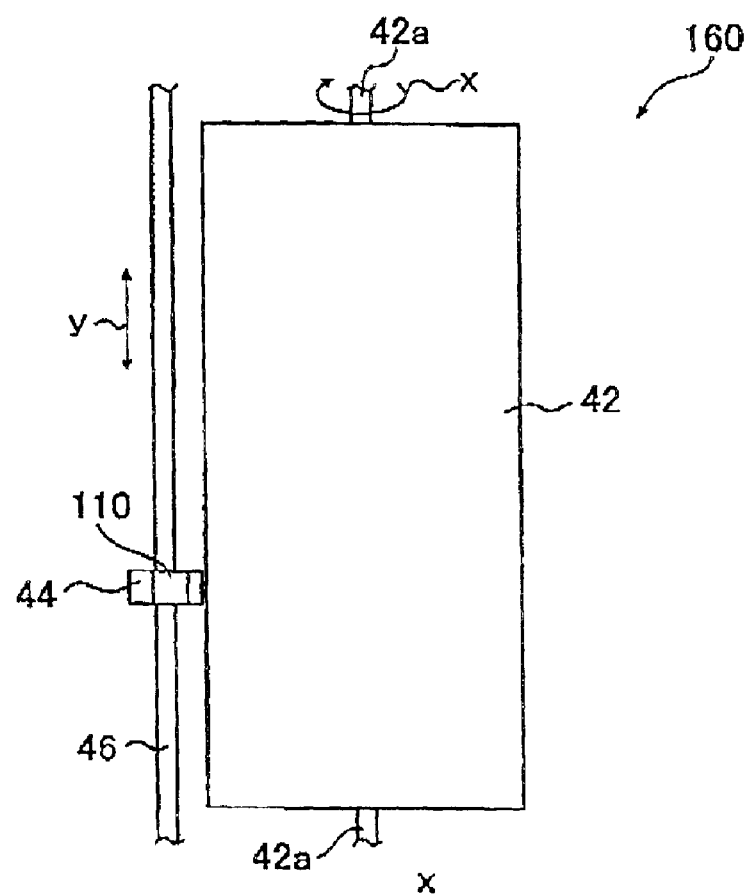
FIG. 11A is a schematic plan view showing another embodiment of the image recording apparatus of the present invention.
Figure 11B:
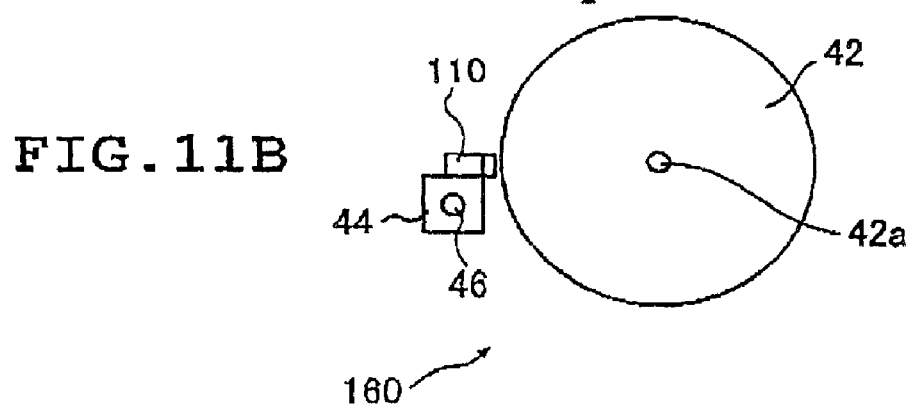
FIG. 11B is a schematic side view thereof.
Figure 12:
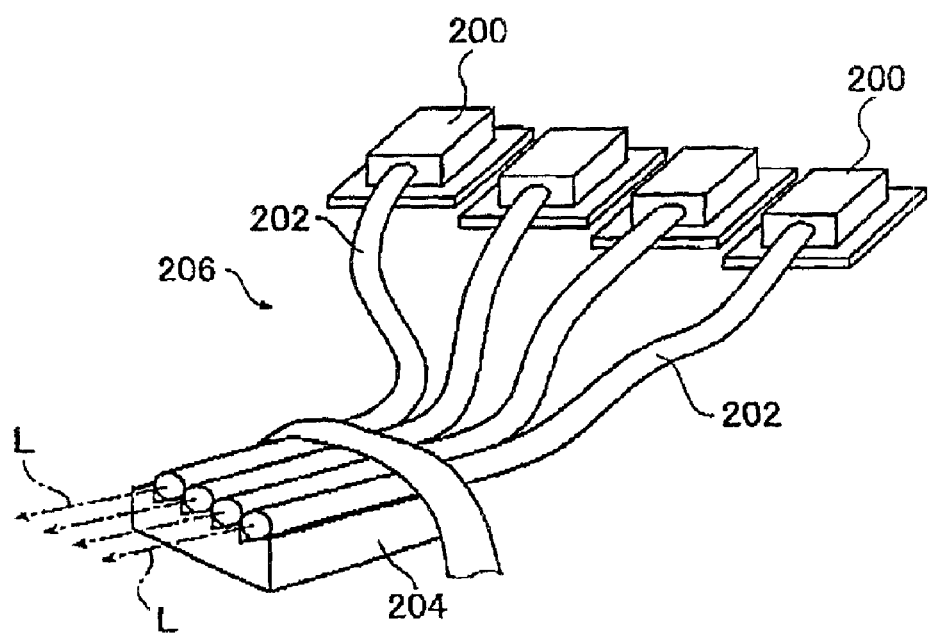
FIG. 12 is a schematic perspective view of a conventional multi-channel exposure head.

The above-described exposure head of the present invention is applicable to various kinds of the image recording apparatus such as the computer to plate (CTP), the image setter, the digital direct color proof (DDCP), the printer and the copying machine. FIGS. 11A and 11B show an example of the image recording apparatus using the exposure head 110 of the second aspect of the present invention. FIG. 11A is a schematic plan view thereof and FIG. 11B is a schematic side view thereof.

An image recording apparatus 160 shown in FIGS. 11A and 11B includes the construction and the function similar to those of the image recording apparatus 40 shown in FIGS. 7A and 7B except for that the exposure head 110 of the second aspect of the present invention is used instead of the exposure head 10 of the first aspect of the present invention. Thus, the same symbols are used to designate the similar components and the detailed description will be omitted.

The image recording apparatus 160 shown in FIGS. 11A and 11B is also a so-called drum scanner exposing to light with winding the photosensitive material around the cylindrical-shaped drum 42. The image recording apparatus 160 is similar to the normal drum scanner except for using the exposure head 110 of this aspect, and includes the exposure head 110 of the present invention, the drum 42, the carriage 44 holding the exposure head 110 and the guide 46 guiding the carriage 44.

The exposure head 110 is held by the carriage 44 so as to make the scanning direction (arrangement direction of the modulator 116, that is, the direction of the arrow y) match with the shaft line of the drum 42.

In the above-described image recording apparatus 160, the drum 42 is rotated (main scanning) at a predetermined speed in the direction of the arrow x and the carriage 44 makes the exposure head 110 move (sub-scanning) in the scanning direction, so the multi-channel exposure head 110 performs two-dimensional scanning of the photosensitive material held by the drum 42.

At this time, the electrode plate 120 of the modulator 116 is brought into contact with the electrode 134 of the modulator 116 or disposed at a distance from the electrode 134 of the modulator 116 as described above in accordance with the recording image, with the result that the angle of the dielectric multi-layer film 132 of the modulation member 122 is changed; the emission of the laser beams L from each of the channels (each of the modulators 116) is modulated; the image-like exposure to the photosensitive material is performed by the laser beams L; and the image is recorded. Note that the image recording may be performed by a well-known method in the image recording in which the photosensitive material is exposed to light by the modulation of the laser beam L such as the modulation of the pulse-width.

Also, in the above-described embodiment, the modulator 116 is constructed so that the laser beam is penetrated through the dielectric multi-layer film in the state that a voltage is not applied by the driving power source 126. However, the present invention is not limited to this construction. For example, the present invention may be constructed such that the modulation means is disposed so as to reflect the laser beams in the state that a voltage is not applied and the dielectric multi-layer film becomes perpendicular with respect to the laser beams by the application of a voltage.

The optical modulator, the exposure head and the image recording apparatus of the present invention are specifically described above with various embodiments. However, it is to be understood that the present invention is not intended to be limited to the above-described embodiments, and various changes or modifications may be made therein without departing from the spirit of the present invention.

As described above in detail, according to the present invention, it is possible to perform the multi-channel exposure by a plurality of laser beams each having the uniform amount of light and realize the image recording at a high speed and with a high image quality.

In addition, the implementation of the multi-channel exposure is realized by using the micro-machine such as the MEMS and the low-cost broad area LD. Thus, the present multi-channel exposure is low in cost and easily enables the increase in the number of the channels compared with the conventional multi-channel exposure adapting the expensive fiber couple LD.

What is claimed is:

1. An exposure head, comprising:
   an optical modulator which includes:
   an optical waveguide for receiving light entered from a first end surface thereof and for emitting the light from a second end surface opposing to the first end surface;
   a plurality of flexible light transmitting members, disposed so as to face with a boundary surface of said optical waveguide and has a gap between the flexible members and the boundary surface of the optical waveguide, said plurality of flexible light transmitting members being arranged in a direction orthogonal to a traveling direction of the light in the optical waveguide; and
   a modulation device for bringing said plurality of flexible light transmitting members into contact with the boundary surface of the optical waveguide, said modulation device being set in correspondence with each of said plurality of flexible light transmitting members; and
   a light source allowing the light to enter into the first end surface on a light incidence side of the optical waveguide,
   wherein said modulation device switches functions of said optical waveguide with respect to the plurality of flexible light transmitting members, one function being that at least one of the flexible light transmitting members is brought into contact with the boundary surface of said optical waveguide to stop emitting of the light propagating in said optical waveguide from said second end surface to direct light outside via the boundary surface, another function being that said at least one flexible light transmitting member is brought into a non-contact condition with respect to the boundary surface of said optical waveguide to emit the light propagating in said optical waveguide, and
   wherein said light emitting from said second end surface of said optical waveguide to outside is used for image exposure.

2. The exposure head according to claim 1, wherein each of said plurality of flexible light transmitting members is formed of a transparent material having electrical conductivity, and said modulation device brings the plurality of light transmitting members into contact with the boundary surface of the optical waveguide by using static electricity.

3. The exposure head according to claim 1, wherein said light source emits the light diffusing in an arrangement direction of said plurality of flexible light transmitting members, and each of said plurality of flexible light transmitting members is disposed so as to have a predetermined distance from the first end surface of the light incidence side of the optical waveguide with respect to the traveling direction of the light.

4. The exposure head according to claim 1, wherein said light emitted from said light source is directly entered to the first end surface on the light incidence side of said optical waveguide.

5. The exposure head according to claim 1, further comprising:
   a lens disposed between a light emission portion of said light source and the first end surface on the light incidence side of said optical waveguide.

6. The exposure head according to claim 1, further comprising:
   an imaging optical system focusing the light emitted from the optical waveguide at a predetermined position.

7. The exposure head of claim 1, wherein the boundary surface of the optical waveguide is on a surface different from the first end surface and the second end surface.

8. The exposure head of claim 7, wherein each of said plurality of the flexible light transmitting members, has an edge aligned with the second end surface of the waveguide.

9. An image recording apparatus, comprising:
   an exposure head; and
   a scanning device for relatively moving a photosensitive material and said exposure head, said exposure head having;
   an optical modulator which includes:
   an optical waveguide for receiving light entered from a first end surface thereof and for emitting the light from a second end surface opposing to the first end surface;

a plurality of flexible light transmitting members, disposed so as to face with a boundary surface of said optical waveguide and has a gap between the flexible members and the boundary surface of the optical waveguide, said plurality of flexible light transmitting members being arranged in a direction orthogonal to a traveling direction of the light in the optical waveguide; and a modulation device for bringing said plurality of flexible light transmitting members into contact with the boundary surface of the optical waveguide, said modulation device being set in correspondence with each of said plurality of flexible light transmitting members; and a light source allowing the light to enter into the first end surface on a light incidence side of the optical waveguide.

10. The image recording apparatus according to claim 9, wherein said modulation device switches functions of said optical waveguide in relation to at least one of the plurality of flexible light transmitting members, one function being that said at least one flexible light transmitting member is brought into contact with the boundary surface of said optical waveguide to stop emitting of the light propagating in said optical waveguide from said second end surface to direct light outside via the boundary surface, another function being that said flexible light transmitting member is brought into a non-contact condition with the boundary surface of said optical waveguide to emit the light propagating in said optical waveguide.

11. An exposure head, comprising:

an optical modulator which includes:

an optical waveguide for receiving light entered from a first end surface thereof and for emitting the light from a second end surface opposing to the first end surface;

a plurality of light adjustment members, disposed to face at least one of: a boundary surface of the optical waveguide and the second end surface of the optical waveguide, wherein the boundary surface is disposed on a face of the optical waveguide other than the first and second end surfaces; and a driving device to change a configuration of the light adjustment members to modulate light propagated by the waveguide, wherein said driving device switches functions of said optical waveguide in relation to at least one of the plurality of light adjustment members, one function being that the at least one light adjusting member is brought into contact with the boundary surface of said optical waveguide to stop emitting of the light propagating in said optical waveguide from said second end surface to direct light outside via the boundary surface, another function being that said light adjusting member is brought into a non-contact condition with the boundary surface of said optical waveguide to emit the light propagating in said optical waveguide, and wherein said light emitting from said second end surface of said optical waveguide to outside is used for image exposure.

12. An image recording apparatus, comprising:

an exposure head; and a scanning device for relatively moving a photosensitive material and said exposure head, said exposure head having;

an optical modulator which includes:

an optical waveguide for receiving light entered from a first end surface thereof and for emitting the light from a second end surface opposing to the first end surface;

a plurality of light adjustment members, disposed to face at least one of: a boundary surface of the optical waveguide the second end surface of the optical waveguide, wherein the boundary surface is disposed on a face of the optical waveguide other than the first and second end surfaces; and a driving device to change a configuration of the light adjustment member to modulate light propagated by the waveguide.

13. An exposure head, comprising:

an optical modulator which includes:

an optical waveguide for receiving light entered from a first end surface thereof and for emitting the light from a second end surface opposing to the first end surface;

a plurality of flexible light transmitting members, disposed so as to face with a boundary surface of said optical waveguide and has a gap between the flexible members and the boundary surface of the optical waveguide, said plurality of flexible light transmitting members being arranged in a direction orthogonal to a traveling direction of the light in the optical waveguide; and a modulation device for bringing said plurality of flexible light transmitting members into contact with the boundary surface of the optical waveguide, said modulation device being set in correspondence with each of said plurality of flexible light transmitting members; and a light source allowing the light to enter into the first end surface on a light incidence side of the optical waveguide, and a light receiving structure disposed adjacent to the second end surface to use the light emitted from the second end surface of the waveguide, and wherein said light emitting from said second end surface of said optical waveguide to outside is used for image exposure.

14. The exposure head of claim 13, wherein the modulation device controls the plurality of flexible light transmitting members independently of each other.

* * * * *